United States Patent Office 3,410,668
Patented Nov. 12, 1968

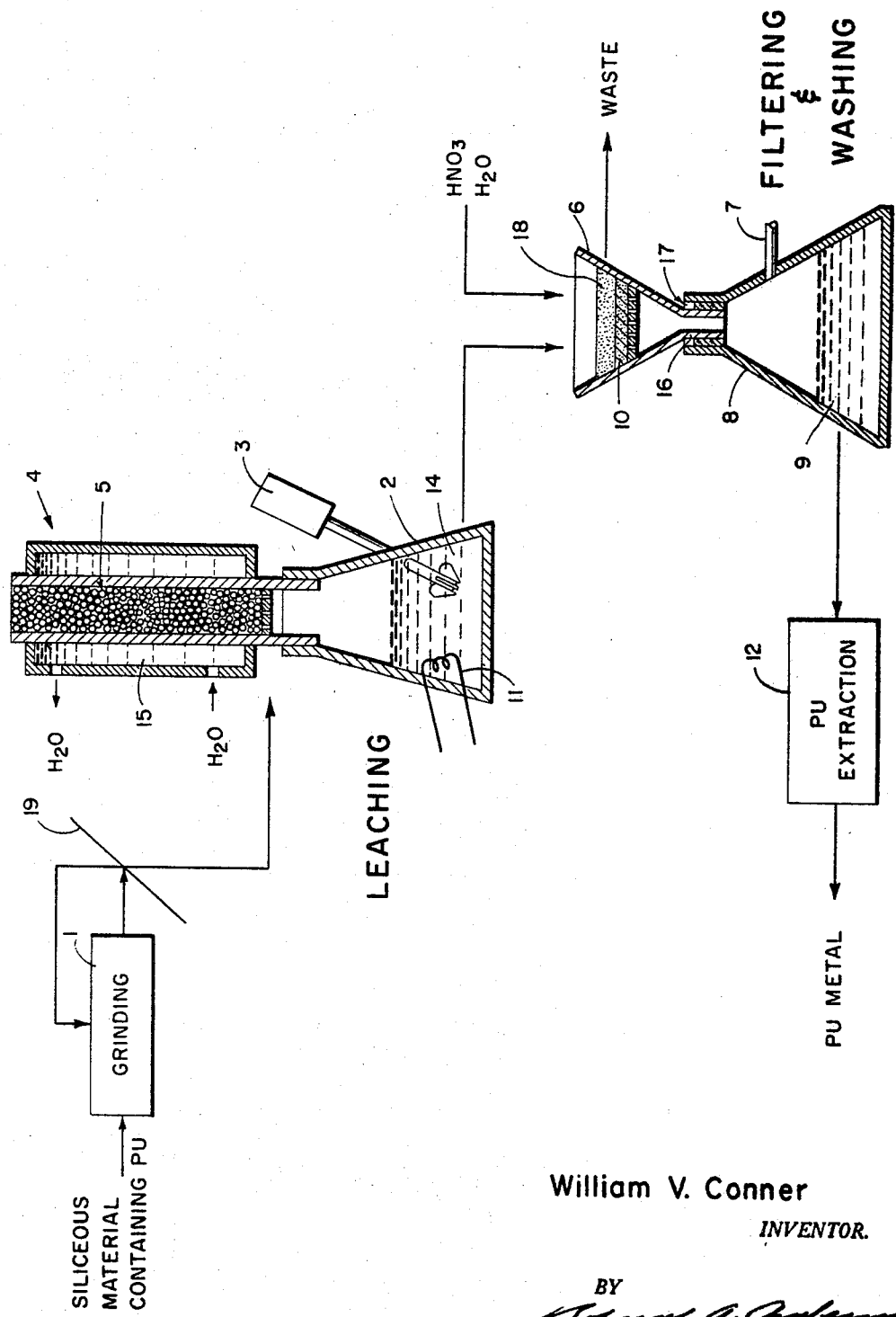

3,410,668
RECOVERY OF PLUTONIUM FROM REFRACTORY SILICEOUS MATERIALS
William Vaughan Conner, Nederland, Colo., assignor to the United States of America as represented by the United States Atomic Energy Commission
Filed Nov. 22, 1967, Ser. No. 685,177
3 Claims. (Cl. 23—342)

ABSTRACT OF THE DISCLOSURE

A method recovering plutonium from siliceous materials containing plutonium and coincidently at least partially decontaminating such materials, comprising grinding the material to a fine powder, leaching the plutonium from the powder with a solution of nitric acid ($HNO_3$) containing fluoride ions, filtering the residual powder from the solution for repetition of the leaching step if the filtered powder contains substantial plutonium, and discarding the filtered powder while retaining the $HNO_3$ solution for Pu extraction.

Background of invention

Use of radioactive materials in power plants, factories and laboratories produces radioactive-contaminated materials which cannot be disposed in ordinary channels of refuse. Furthermore, the radioactive materials are of great value rendering their recovery desirable. For instance plutonium (Pu) to which this application is directed, is presently valued at about $30.00 per gram.

Prior art methods of separating plutonium (Pu) and other transuranic values from such materials as irradiated reactor fuels and rare or alkaline earth fission products have comprised melting or dissolving the materials and subsequent treatment of the resulting liquids.

These methods are inadequate for decontaminating siliceous insulative and refractory materials (for example, from the firebrick and insulation of furnaces used to concentrate plutonium-contaminated waste) which melt at extremly high temperatures and possibly decompose or oxidize at temperatures below their melting points. Furthermore, these materials are difficult to dissolve in any solvent which would permit subsequent extraction of pure plutonium.

Summary of invention

Therefore it is an object of this invention to provide a process for recovering plutonium from solid siliceous materials and hence at least partial decontamination of such materials.

It is a further object to provide such a plutonium recovery process which is applicable to siliceous materials with varying plutonium concentrations.

The invention is a method for recovering plutonium from siliceous materials comprising grinding the material to a fine powder, heating and agitating the powder with a fluoride solution of nitric acid ($HNO_3$) to dissolve the Pu solids, filtering the residual powder from the solution with subsequent washing for reprocessing or disposal depending on plutonium concentration, and extracting the dissolved plutonium from the filtrate.

Various other objects and advantages will appear from the following description of one embodiment of the invention and the most novel features will be pointed out hereinafter in the appended claims.

Description of drawings

The drawing is a schematic flow diagram of the process for recovery of Pu from siliceous materials, showing various parts in cross section.

Detailed description

The process shown in the drawing may be carried out on a batch basis with the steps performed in succession in laboratory or plant size equipment. Since the contaminated siliceous materials are radioactive to varying extents, appropriate precautions such as use of a glove box should be taken consistent with the radiation level.

The contaminated siliceous material may be ground to a powder of less than 35 Tyler standard mesh in a ball mill or other suitable grinding equipment 1 to expose the Pu imbedded therein. If the available material, insulation or firebrick, is of greater size than that which may be conveniently powdered in a suitably sized ball mill, a preparatory size reduction process may be performed in a jaw crusher or other suitable apparatus. However, where furnace firebrick is to be processed it may be desirable to scarf or separate the plutonium-carrying surface layers for grinding. The residual bulk pieces may be discarded if the Pu has been substantially removed.

To insure that all particles of siliceous material have been sufficiently ground, a 35 mesh shaker screen 19 may classify all material discharged from the grinding operation and oversized particles may be retained for regrinding in a subsequent batch or continuously recycled.

The ground and classified powder may next be mixed to form a slurry 14 with a 9–13 N $HNO_3$ aqueous solution containing about 0.3 to 0.4 moles per liter of fluoride ions. A particularly effective solution may be prepared from 12 N $HNO_3$ with addition of about 15 grams per liter of calcium fluoride ($CaF_2$). Calcium fluoride is an especially suitable contributor of flouride ions as its solubility in nitric acid solutions of the specified concentrations is limited to about 15 grams per liter. Hence, excess $CaF_2$ may be added which will only dissolve to maintain a fluoride ion concentration suitable for Pu dissolution without unduly subjecting the process equipment to fluoride corrosion.

The slurry may be heated with agitation or leached at a temperature of about 100° C.–110° C. for about one to six hours in a flask or vessel 2. Generally, leaching for two hours is satisfactory. A suitable heater 11 such as an electrical immersion heater may supply heat while an agitator 3 of any suitable type vigorously stirs the slurry. A reflux column 4 having a flowing water jacket 15 and suitable packing 5 such as glass beads may condense overhead vapors which may gravitate back into slurry 14 to avoid loss of volatiles during leaching. Use of reflux column 4 will allow the solution to proceed to boiling, which occurs between 100–110° C. at ambient pressure, to enhance agitation during leaching. Furthermore, the reflux column will minimize escape of corrosive vapors. If desired the flask 2 and reflux column 4 may be pressurized to raise the boiling point of the slurry 14 and allow leaching at a higher temperature.

After leaching the powder may be filtered from the solution by pouring through a glass frit or other suitable filter 10 supported by a suitable structure 6 such as a funnel having a spout 16 extending into the opening 17 of a receiver 8 for discharging the filtrate 9. The receiver 8 may be suitably evacuated such as through conduit 7 and hermetically sealed such as at its opening 17 around the filter funnel spout 16 to maintain vacuum and facilitate flow of filtrate 9 through the filter 10 into the receiver. Other suitable filtering equipment such as a rotary drum type may also be used especially for industrial sized processes.

After the solution has passed through the filter, the powder forming a filter cake 18 on the filter surface may be removed and agitated with fresh nitric acid of about 12 normal in aqueous solution to wash away any Pu which may be left in solution on the cake. The wash mixture may be refiltered in the manner described with combination of the wash filtrate and the filtrate previously collected.

After drying the siliceous filter cake by any suitable method, the Pu concentration may be determined by suitable analysis such as by gamma-neutron counting. If the radiation or Pu concentration level is considered too high by an economic analysis or balance the filtered powder may be recycled and again leached, filtered and washed as described. Whenever the Pu concentration becomes sufficiently low the siliceous material may be discarded.

Where the number of leaching and filtering cycles or steps required is unknown the filter cake must be washed after each cycle or stage prior to determining Pu concentration. However, once the number of leaching stages or steps is determined for a particular feed material, the washing operation need only be performed once as a final step in decontaminating the siliceous materials since its purpose is only to wash off solution containing dissolved Pu adhering to the filter cake.

If desired the repetitive leaching, washing and filtering operations described may be arranged into a selected number of countercurrent stages or steps in accordance with the Pu concentration in the feed material to be processed. The final stage containing the lowest concentration of Pu in the siliceous material may be conducted as the washing operation while the remaining stages may comprise the repetitive leaching operations. This modification may be practical for large scale decontamination and Pu recovery.

The filtrate 9 collected may be further processed in a known manner to extract the dissolved Pu (e.g. sufficient water may be added to the filtrate to adjust to 7 N $HNO_3$ concentration such that a $Pu(NO_3)_6^=$ anion complex is formed. Aluminum nitrate salt may be added to insure against formation of plutonium fluoride cation complexes. The filtrate may then be passed through a strongly basic anion exchange resin which may presently be obtained under the trade name Dowex 1. The $Pu(NO_3)_6^=$ anion is adsorbed on the resin while cation impurities pass through with the filtrate solution. The complex may be broken with a 0.35 N $HNO_3$ wash solution which will elute the purified Pu from the ion exchange column.

Next concentrated sulfuric ($H_2SO_4$) and nitric ($HNO_3$) acids may be added to adjust the acidity of the wash solution containing $Pu^{+4}$ to 4.8 N and the plutonium-sulfate ion ratio to 11/1. Sufficient 35% hydrogen peroxide ($H_2O_2$) may be next added to precipitate substantially all the Pu as plutonium peroxide ($PuO_4$). This precipitate is filtered out and calcined in air at 450° C. to produce a non-stoichiometric oxide which is treated with hydrofluoric acid (HF) at 650° C. to produce plutonium tetrafluoride ($PuF_4$). Finally, the $PuF_4$ may be heated with calcium metal (Ca) to reduce it to plutonium metal.

The process apparatus described may be of almost any suitable materials of construction. The grinding equipment 1 and screen 19 may be of ordinary alloy steel. The flask or leaching vessel 2 may be made of a suitable material which resists $HNO_3$ and fluoride attack such as stainless steel. Likewise, the remaining process equipment wetted parts such as the agitator propeller, filter funnel 6 and the filtrate container 8 should be of glass, stainless steel or other material resistant to $HNO_3$ and fluoride attack at the concentrations used.

Example 1

Feed comprising 600 grams of asbestos insulation containing 4.8 grams of Pu is ground and classified to less than 35 Tyler standard mesh in a ball mill equipped with a shaker screen at its discharge. The resulting powder is mixed with three liters of 12 N $HNO_3$ and 50 grams of $CaF_2$ in a 4 liter stainless steel leaching vessel to form a slurry. The slurry is heated and agitated at 103° C. for 2 hours to dissolve the Pu while refluxing the overhead vapors back into the slurry. The slurry is then filtered through a glass frit filter. The filter cake is removed and agitated with one liter of cold 12 N $HNO_3$ for 5 minutes and refiltered. The combined filtrate contains 3.12 grams of Pu and 274 grams of other dissolved feed materials showing that 65% by weight of the Pu in the feed and 46% of the total feed solids are dissolved. The washed filter cake weighs 323 grams and contains 1.7 grams of Pu which is considered, based on economics, too high a concentration for disposal. The filter cake is reprocessed as described dissolving 67% of the remaining 1.7 grams of Pu and 6.5% of the total cake. The filter cake formed which weighs 302 grams and contains 0.56 gram of Pu is discarded. The combined filtrate contains 4.3 grams of dissolved Pu for a yield of 90% of the Pu in the feed.

Example 2

Large pieces of silica firebrick are scarfed to remove pieces from the exposed surfaces. The pieces are broken up in a jaw crusher and then ground and classified to less than 35 Tyler standard mesh. 320 grams of the 35 mesh material containing 16 grams of Pu is heated for 2 hours with 50 grams of $CaF_2$ and 3 liters of 12 N $HNO_3$. The resulting slurry is filtered through a glass frit filter, washed with 12 N $HNO_3$, and dried. Fifty-eight percent by weight of the Pu in the feed powder is dissolved into the filtrate leaving 7 grams in the 251 gram filter cake. The filter cake is twice reprocessed dissolving 61% and then 59% of the remaining Pu before discarding the decontaminated siliceous filter cake containing about 0.4% Pu. About 15 grams of the original 16 grams of Pu in the feed materials is dissolved in the filtrate for recovery following this three cycle operation.

This method of the present invention has been used to decontaminate glass wool, asbestos, and alumina-silica insulations as well as silica refractory firebrick containing between about 0.5 and 5 weight percent Pu. The Pu extracted in each leaching and filtering cycle or stage ranged from 58% to 86% and is affected by texture of the feed material and not on the starting concentration or whether the run was an original or a reprocess. For instance distortable insulation feed materials have consistently yielded higher Pu recovery than have tough rigid firebrick.

This method allows plutonium recovery from and decontamination of waste siliceous materials which would heretofore have to be stored or disposed in a manner prescribed by the radiation danger. Furthermore, valuable Pu which previously would have been lost may be recovered from these waste siliceous materials. Also, by means of discretionary recycle, the process is flexible enough to accommodate feed materials having a broad range of Pu concentrations.

It will be understood that various changes in the procedures, materials used and arrangements of the process steps described to explain the invention may be made by those skilled in the art within the principles of the invention expressed in the appended claims.

What is claimed is:

1. Method of recovering plutonium from and decontaminating siliceous insulative and refractory material used in furnaces for concentrating plutonium contaminated waste comprising grinding said materials containing plutonium to a powder of particle size less than about 35 mesh, leaching and agitating said powder for about two hours within a boiling solution of about 9 to 13 molar nitric acid containing fluoride ions from calcium fluoride to dissolve about sixty percent by weight of said plutonium, filtering the residual powder from said solution, repeating said leaching, agitating and filtering steps until the plutonium concentration within said powder is reduced to an acceptable level, washing and agitating said filtered powder within about 9 to 13 molar nitric acid wash solution for about five minutes, filtering said washed powder from said wash solution, and recovering plutonium from the filtrate including said wash solution.

2. The method according to claim 1 whereby leaching and agitating is carried out at about 100–110° C. in intimate contact with about 12 N $HNO_3$ solution containing about 15 grams per liter of $CaF_2$.

3. The method of claim 1 wherein said siliceous material comprises silica firebrick and said step of grinding includes scraping plutonium-carrying surface layers from said firebrick, and milling said surface layers to a particle size less than about 35 mesh.

References Cited

UNITED STATES PATENTS 3,259,473   7/1966   Hopkins et al. _____ 23—344

FOREIGN PATENTS 865,699   4/1961   Great Britain.

BENJAMIN R. PADGETT, *Primary Examiner.*

M. J. McGREAL, *Assistant Examiner.*